United States Patent
Gonze et al.

(10) Patent No.: US 9,482,125 B2
(45) Date of Patent: Nov. 1, 2016

(54) PARTICULATE FILTER AND HYDROCARBON ADSORBER BYPASS SYSTEMS

(75) Inventors: Eugene V. Gonze, Pinckney, MI (US); Halim G. Santoso, Novi, MI (US); Michael J. Paratore, Jr., Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1100 days.

(21) Appl. No.: 12/881,441

(22) Filed: Sep. 14, 2010

(65) Prior Publication Data
US 2012/0060482 A1    Mar. 15, 2012

(51) Int. Cl.
| | |
|---|---|
| F01N 3/00 | (2006.01) |
| F01N 3/031 | (2006.01) |
| F01N 3/08 | (2006.01) |
| F01N 9/00 | (2006.01) |

(52) U.S. Cl.
CPC ............. *F01N 3/031* (2013.01); *F01N 3/0821* (2013.01); *F01N 3/0878* (2013.01); *F01N 9/002* (2013.01); *Y02T 10/20* (2013.01); *Y02T 10/47* (2013.01)

(58) Field of Classification Search
CPC ............................... F01N 3/031; F01N 3/0878
USPC .................................................... 60/272–324
See application file for complete search history.

(56) References Cited

U.S. PATENT DOCUMENTS

| | | | | |
|---|---|---|---|---|
| 4,478,067 | A * | 10/1984 | Ohta et al. | 73/23.31 |
| 4,485,621 | A * | 12/1984 | Wong et al. | 60/274 |
| 4,934,142 | A * | 6/1990 | Hayashi et al. | 60/297 |
| 5,195,316 | A * | 3/1993 | Shinzawa et al. | 60/274 |
| 5,398,503 | A | 3/1995 | Danno et al. | |
| 5,589,143 | A * | 12/1996 | Mori et al. | 422/171 |
| 6,167,696 | B1 * | 1/2001 | Maaseidvaag et al. | 60/274 |
| 6,233,927 | B1 * | 5/2001 | Hirota et al. | 60/297 |
| 7,117,667 | B2 * | 10/2006 | Mital et al. | 60/286 |
| 8,051,647 | B2 * | 11/2011 | Tsujimoto et al. | 60/297 |
| 8,261,534 | B2 | 9/2012 | Sano et al. | |
| 2004/0244362 | A1 * | 12/2004 | Hiranuma et al. | 60/276 |
| 2010/0205939 | A1 | 8/2010 | Sano et al. | |

FOREIGN PATENT DOCUMENTS

CN            101578433 A      11/2009

* cited by examiner

*Primary Examiner* — Audrey K Bradley
*Assistant Examiner* — Anthony Ayala Delgado

(57) ABSTRACT

A regeneration system includes a first comparison module that at least one of (i) compares a first temperature of an adsorber to an adsorber release temperature and (ii) compares a second temperature of an engine to a predetermined temperature, and generates a first comparison signal. A second comparison module that compares a particulate matter output of the engine with a predetermined output and generates a second comparison signal. A mode selection module that selects a mode and generates a mode signal based on the first comparison signal and the second comparison signal. A bypass valve control module that adjusts position of a bypass valve to bypass at least one of a particulate matter (PM) filter and the adsorber based on the mode signal.

19 Claims, 7 Drawing Sheets

_US 9,482,125 B2_

PARTICULATE FILTER AND HYDROCARBON ADSORBER BYPASS SYSTEMS

FIELD

The present disclosure relates to particulate matter filters and hydrocarbon adsorbers of an exhaust system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Catalytic converters are used in an exhaust system of an internal combustion engine (ICE) to reduce emissions. For example, a three-way catalyst converter (TWC) reduces nitrogen oxide, carbon monoxide and hydrocarbons within an exhaust system. The three-way catalyst converter: converts nitrogen oxide to nitrogen and oxygen; converts carbon monoxide to carbon dioxide; and oxidizes unburnt hydrocarbons (HC) to produce carbon dioxide and water.

An average catalyst light-off temperature at which a catalytic converter typically begins to function is approximately 600° C. As a result, a catalytic converter does not function or provides minimal emission reduction during a warm up period that occurs upon a cold start up of an engine. Exhaust system temperatures are less than the catalyst light-off temperature during an engine cold start. During the warm up period, HC emissions may not be effectively processed by the catalytic converter.

A hydrocarbon adsorber may be used to trap HC during the warm up period. Hydrocarbon adsorbers typically trap HC when at a temperature approximately less than 100° C. and release trapped hydrocarbons at temperatures greater than or equal to approximately 100° C.

In a petroleum based engine system, particulate matter (PM) is generated during the warm up period. A PM filter may be used to trap the PM generated during the warm up period.

SUMMARY

A regeneration system is provided and includes a first comparison module. The first comparison module at least one of (i) compares a first temperature of an adsorber to an adsorber release temperature and (ii) compares a second temperature of an engine to a predetermined temperature, and generates a first comparison signal. A second comparison module that compares a particulate matter output of the engine with a predetermined output and generates a second comparison signal. A mode selection module that selects a mode and generates a mode signal based on the first comparison signal and the second comparison signal. A bypass valve control module that bypasses at least one of a particulate matter (PM) filter and the adsorber based on the mode signal via a bypass value.

A method of operating a regeneration system is provided. The method includes generating a first comparison signal based on at least one of (i) a comparison between a first temperature of an adsorber and an adsorber release temperature and (ii) a comparison between a second temperature of an engine and a predetermined temperature. A second comparison signal is generated based on a comparison between a particulate matter output of the engine and a predetermined output. A mode is selected and a mode signal is generated based on the first comparison signal and the second comparison signal. At least one of a particulate matter (PM) filter and the adsorber is bypassed based on the mode signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
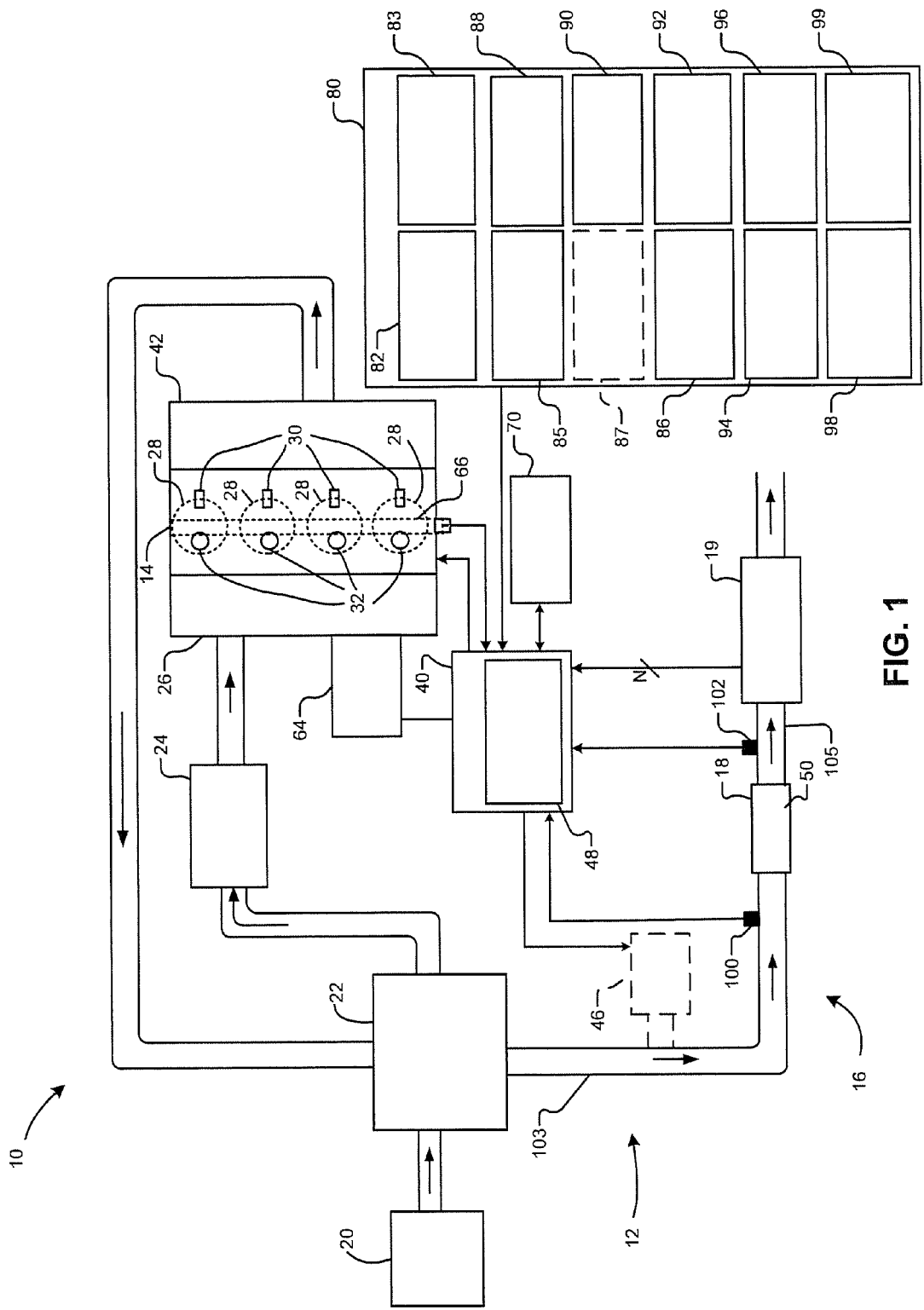
FIG. 1 is a functional block diagram of an exemplary engine system incorporating a regeneration system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

During a cold start of an engine, particulate matter (PM) is generated. A PM filter may be used in an exhaust system of the engine to trap the PM. A PM filter can introduce backpressure within the exhaust system. The following described implementations minimize this backpressure. The back pressure is minimized while allowing for PM trapping during a cold start and efficient regeneration of exhaust system devices, such as a PM filter, an adsorber, a soot sensor, etc.

Figure 2:
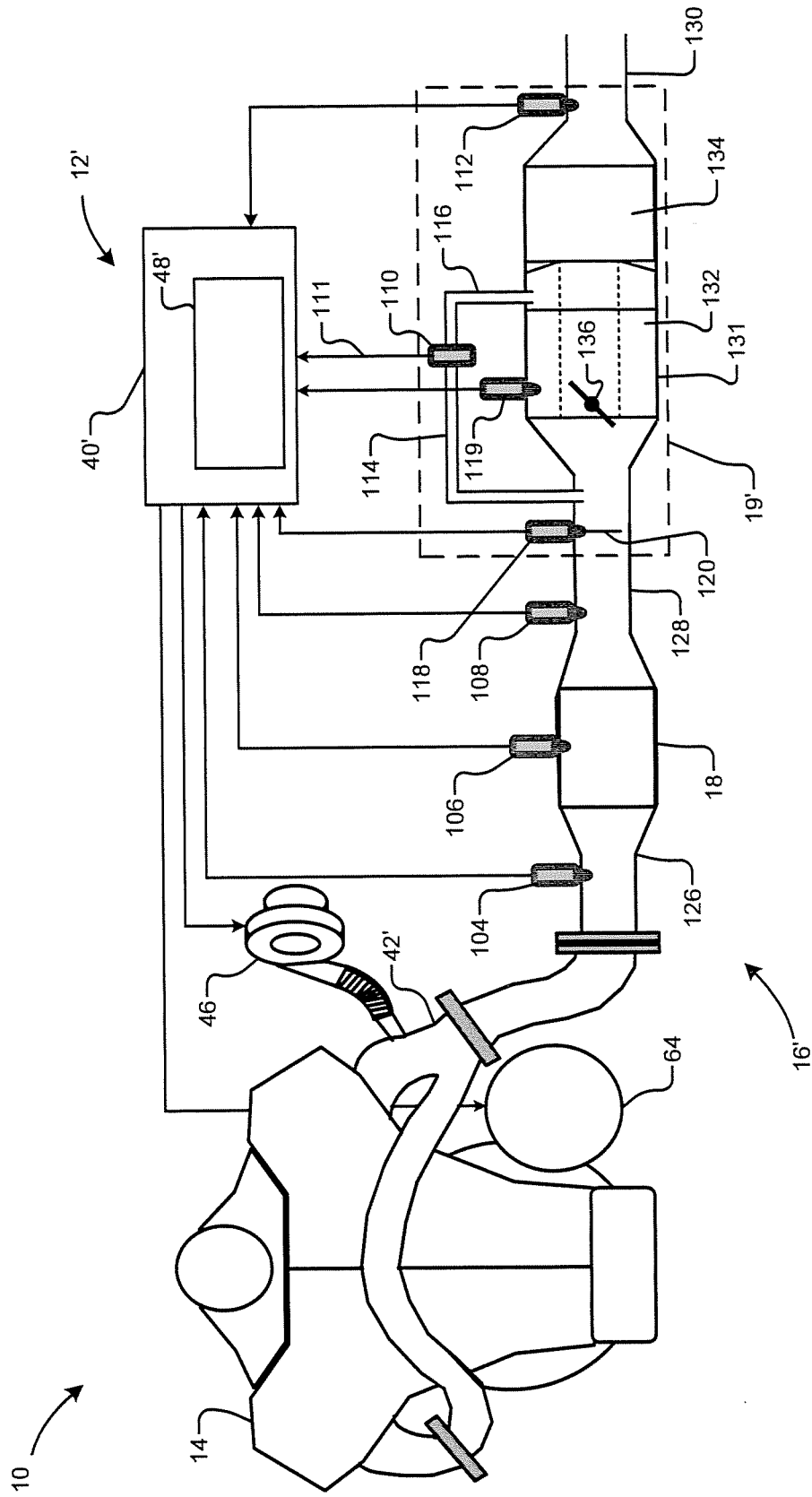
FIG. 2 is a functional block diagram of another engine system and corresponding regeneration system in accordance with the present disclosure.
Figure 3:
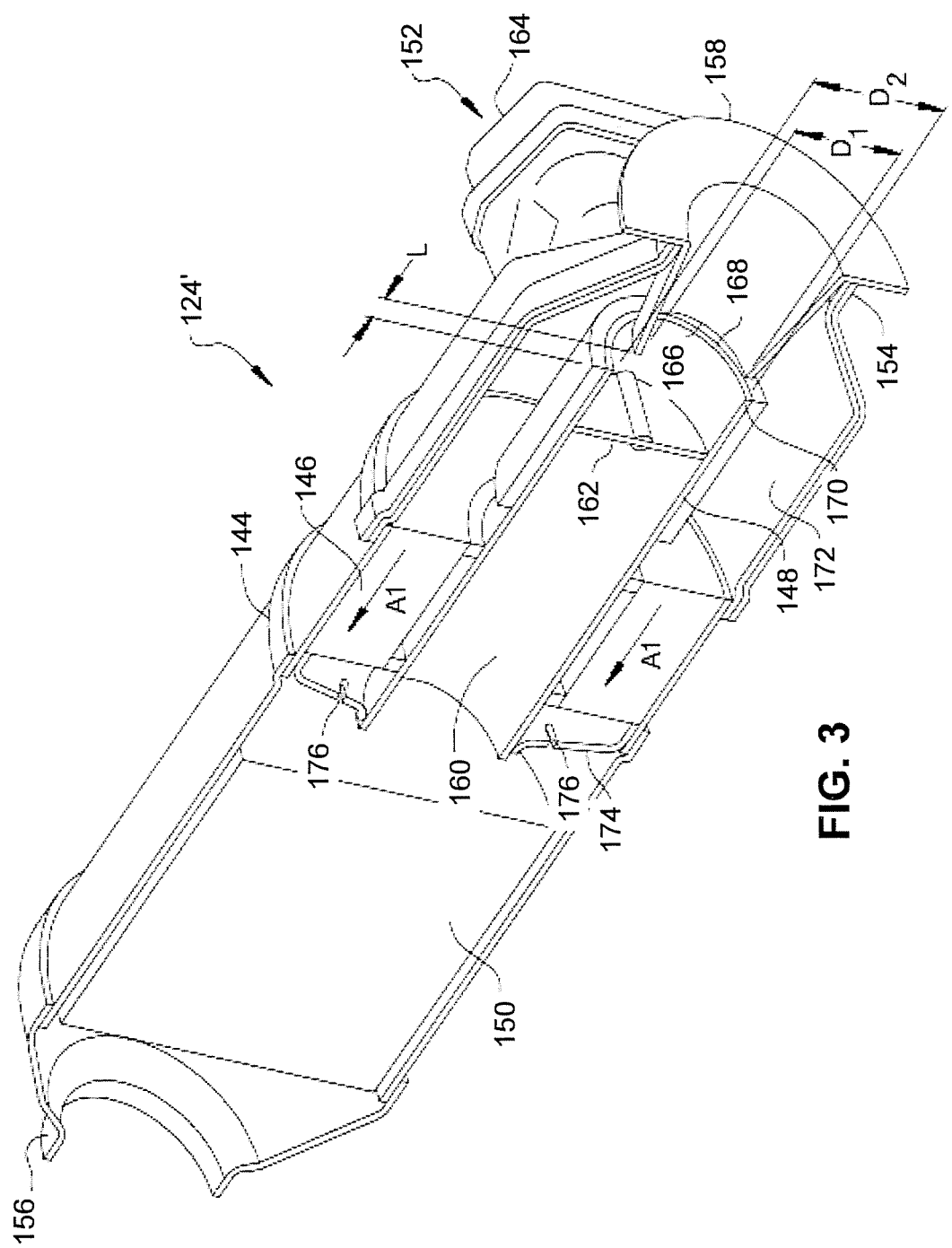
FIG. 3 is a perspective section view of an underfloor assembly in accordance with the present disclosure.
Figure 4:
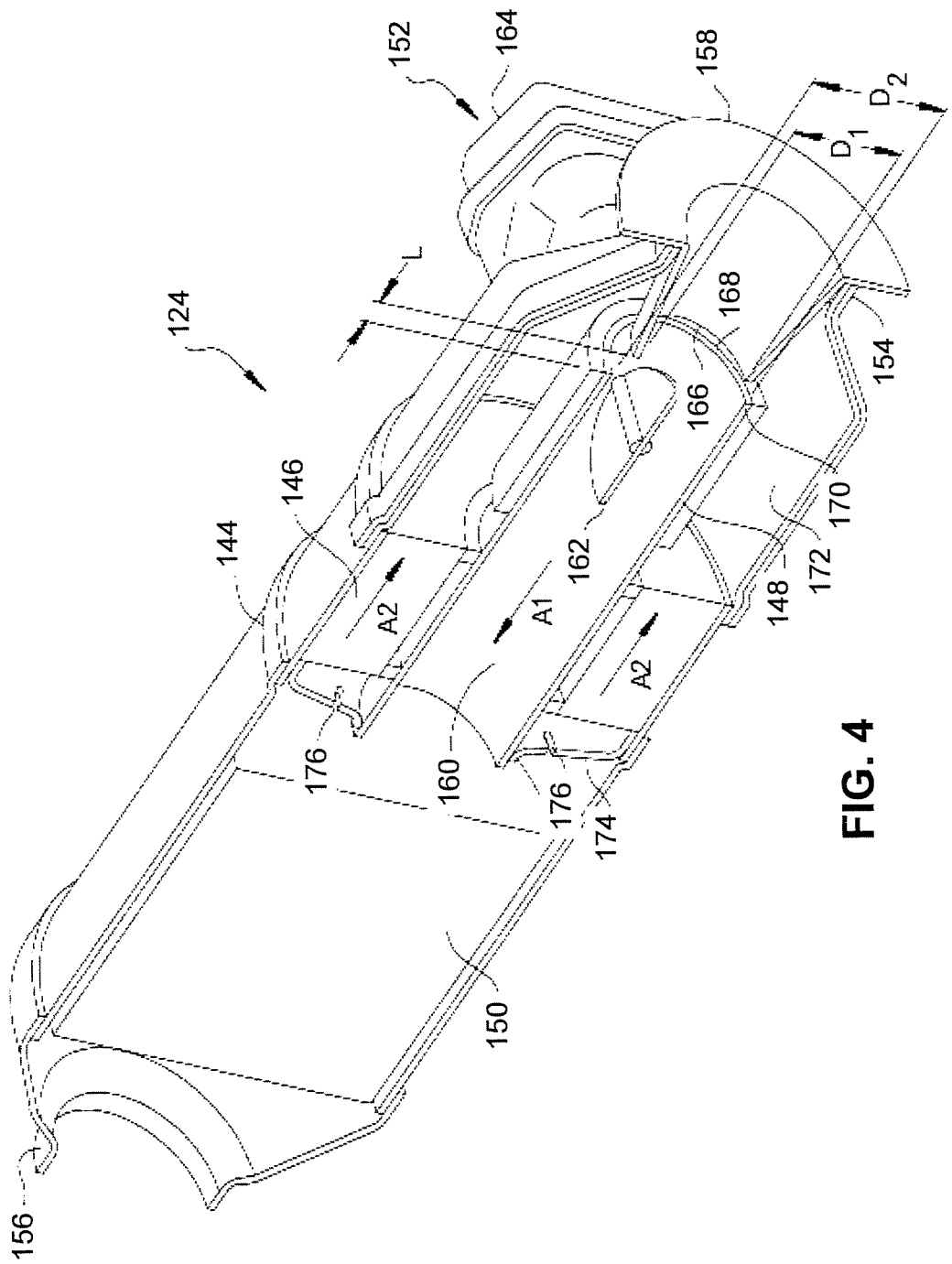
FIG. 4 is another perspective section view of the underfloor assembly of FIG. 3.

In FIG. 1, an exemplary engine system 10 that includes a regeneration system 12 is shown. The engine system 10 includes an engine 14 with an exhaust system 16. The exhaust system 16 includes a close-coupled catalyst or catalytic converter (CC) 18 and a catalyst (underfloor) system 19. The regeneration system 12 may regenerate a PM filter and/or adsorber (PMA) of the underfloor system 19. Example PMAs are shown in FIGS. 2-4. The engine 14 is a gasoline (petroleum) spark ignition engine. The engine 14 may be a direct injection engine. The engine system 10 may be alcohol-based, such as a methanol, ethanol, and/or E85 based engine system.

The engine 14 combusts an air and fuel mixture to produce drive torque. Air enters the engine 14 by passing through an air filter 20. Air passes through the air filter 20 and may be drawn into a turbocharger 22. The turbocharger 22 when included compresses the fresh air. The greater the compression, the greater the output of the engine 14. The compressed air passes through an air cooler 24 when included before entering an intake manifold 26. Air within the intake manifold 26 is distributed into cylinders 28. Fuel is injected into the cylinders 28 by fuel injectors 30. Spark plugs 32 ignite air/fuel mixtures in the cylinders 28. Combustion of the air/fuel mixtures creates exhaust. The exhaust exits the cylinders 28 into the exhaust system 16.

The regeneration system 12 includes the exhaust system 16 and an engine control module (ECM) 40. The exhaust system 16 includes the CC 18, the underfloor system 19, the ECM 40, the exhaust manifold 42, and may include an air pump 46. As an example, the CC 18 may include a three-way catalyst (TWC). The CC 18 may reduce nitrogen oxides NOx, oxidizes carbon monoxide (CO) and oxidizes unburnt hydrocarbons (HC) and volatile organic compounds. The CC 18 oxidizes the exhaust based on a post combustion air/fuel ratio. The amount of oxidation increases the temperature of the exhaust.

Optionally, an EGR valve (not shown) re-circulates a portion of the exhaust back into the intake manifold 26. The remainder of the exhaust is directed into the turbocharger 22 to drive a turbine. The turbine facilitates the compression of the fresh air received from the air filter 20. Exhaust flows from the turbocharger 22 to the CC 18.

The ECM 40 includes a regeneration control module 48, which controls regeneration of the PMA. The regeneration system 12 may operate in an active regeneration mode, a passive regeneration mode, or a non-regeneration mode. During the active regeneration mode, the temperature of the PMA is increased to be greater than or equal to a regeneration temperature (e.g., 600° C.). This allows trapped PM and HC to be released from the PMA. The temperature of the PMA may be increased by altering fuel and/or spark parameters of the engine and/or by operating in an air pumping mode.

During the air pumping mode, air is pumped into the exhaust system 16 to heat the PMA. The air pumping mode may include activation of the air pump 46. The air pump 46 pumps air into the exhaust system 16 upstream from the CC 18. The air pump 46 may pump ambient air into the exhaust system 16. The ambient air may be directed to the exhaust manifold 42 and/or exhaust valves of the engine 14. Heated air that is upstream from the underfloor system 19 is directed through the underfloor system 19. This is performed to (i) maintain the temperature of the PMA at a temperature greater than the regeneration temperature and/or (ii) increase the temperature of the PMA to be greater than or equal to the regeneration temperature.

The passive regeneration mode refers to regeneration of the PMA, for example, after a cold start period and without activation of the air pump 46. The cold start period refers to a period upon activation of the engine 14 when temperature of the engine 14 is less than a predetermined temperature. During the passive regeneration mode, temperature of the PMA is greater than or equal to the regeneration temperature.

The adsorber regeneration system 12 may operate in a non-regeneration mode (i.e. the PMA is not being regenerated) during the cold start period. During the cold start period temperatures of the catalyst(s) of the exhaust system 16, such as catalysts of the CC 18 and/or the underfloor system 19, are increased to at least a light-off temperature. During the cold start period, the PMA is trapping PM and HC.

The ECM 40 controls the engine 14, the regeneration system 12, the air pump 46, and a starter 64 based on sensor information. The ECM 40 may control operation of the starter 64 to rotate a crankshaft 66 and start the engine 14. The sensor information may be obtained directly via sensors and/or indirectly via algorithms and tables stored in memory 70. Some example sensors 80 for determining exhaust flow levels, exhaust temperature levels, exhaust pressure levels, exhaust soot levels, catalyst temperatures, oxygen levels, intake air flow rates, intake air pressure, intake air temperature, vehicle speed, engine speed, EGR, etc are shown. Exhaust flow sensors 82, exhaust temperature sensors 83, exhaust pressure sensors 85, an exhaust soot level sensor 87, catalyst temperature sensors 86, oxygen sensors 88, an EGR sensor 90, an intake air flow sensor 92, an intake air pressure sensor 94, an intake air temperature sensor 96, vehicle speed sensor 98 and an engine speed sensor 99 are shown.

Some of the sensors 80 may be incorporated in the underfloor system 19 and provide signals to the ECM 40 via signal lines N. N is an integer. The regeneration control module 48 may control operation of the regeneration system 12, the engine 14, the air pump 46, and the starter 64 based on the information from the sensors 80.

The oxygen sensors 88 may include a pre-converter $O_2$ sensor 100 and post-converter $O_2$ sensor 102. The pre-converter $O_2$ sensor 100 may be connected to a first exhaust conduit 103 and upstream from the CC 18. The post-converter $O_2$ sensor 102 may be connected to a second exhaust conduit 105 and downstream from the CC 18. The pre-converter $O_2$ sensor 100 communicates with the ECM

40 and measures the $O_2$ content of the exhaust stream entering the CC 18. The post-converter $O_2$ sensor 102 communicates with the ECM 40 and measures the $O_2$ content of the exhaust stream exiting the CC 18. The primary and secondary $O_2$ signals are indicative of $O_2$ levels in the exhaust system 16 before and after the CC 18. The $O_2$ sensors 100, 102 generate respective primary and secondary $O_2$ signals that are feedback to the ECM 40 for closed loop control of air/fuel ratio(s). The ECM 40 adjusts fuel flow, throttle positioning, and spark timing based on the primary and secondary $O_2$ signals to regulate air/fuel ratio(s) in cylinders of the engine 14.

Referring now also to FIG. 2, a functional block diagram of another engine system 10' is shown. The engine system 10' may be part of the engine system 10. The engine system 10' includes the engine 14, a regeneration system 12', an exhaust system 16', and an ECM 40'. In the example shown, the exhaust system 16' includes in the following order: an exhaust manifold 42', a first exhaust conduit 126, the CC 18, a second exhaust conduit 128, an underfloor system 19' and a third exhaust conduit 130.

The regeneration system 12' includes the engine 14, the CC 18, the underfloor system 19', the air pump 46, the regeneration module 48, and/or the starter 64. The regeneration system 12' may also include exhaust flow, pressure and/or temperature sensors 104, 106, 108, 110, 112. The first exhaust flow, pressure and/or temperature sensor 104 may be connected to a first exhaust conduit 126 and upstream from the CC 18. The second exhaust flow, pressure and/or temperature sensor 106 may be connected to the CC 18. The third exhaust flow, pressure and/or temperature sensor 108 may be connected to a second exhaust conduit 128 that is downstream from the CC 18.

The fourth exhaust flow, pressure and/or temperature sensor 110 may be used to detect a pressure differential across a PMA 132 of the underfloor system 19'. The PMA 132 may be a PM filter and/or adsorber (e.g., a PM filter coated with an adsorber material). The fourth exhaust flow, pressure and/or temperature sensor 110 may detect an inlet pressure via a first tap line 114 and an outlet pressure via a second tap line 116. The outlet pressure may be detected at an output of the PMA 132 and may be used as a reference pressure. The fourth exhaust flow, pressure and/or temperature sensor 110 may generate an absolute pressure signal $P_{AP}$ 111 based on a difference between the pressures at the first and second tap lines 114, 116. The fifth exhaust flow, pressure and/or temperature sensor 112 may be connected to the third exhaust conduit 130 that is downstream from the underfloor system 19'.

The regeneration system 12' may also include a soot level sensor 118. The soot level sensor 118 may include a resistive plate, screen, mesh, and/or grid 120 (referred to as resistive plate 120) that is located upstream from the PMA 132. Resistance of the resistive plate 120 decreases as soot level of the PMA 132 increases. The regeneration system 12' may also include a PMA temperature sensor 119 that is connected to the PMA 132 and detects temperature of the PMA 132.

The underfloor system 19' may include an underfloor assembly 131 with the PMA 132, an underfloor catalyst 134, such as a three-way catalyst, and a bypass valve 136. The PMA 132 may include HC adsorber material, such as zeolite material. The underfloor catalyst 134 oxides CO remaining in the exhaust received from the CC 18 and the PMA 132 to generate $CO_2$. The underfloor catalyst 134 may also reduce nitrogen oxides NOx and oxidize unburnt HC and volatile organic compounds.

The ECM 40' and/or regeneration control module 48 may select a mode of operation and control the regeneration system 12' based on information from the sensors 80, 104-112, 118 and/or 119. This may include controlling activation of the air pump 46, operation of the starter 64, and/or position of the bypass valve 136. For example, the bypass valve 136 may be in a partially or fully open position during the passive adsorber regeneration mode or a low PM output mode. The low PM output mode refers to when PM output of the engine 14 is less than a predetermined PM output level. As another example, the bypass valve 136 may be in a fully closed or nearly fully closed position (e.g., 95% closed) during the cold start period (cold start mode) or a regeneration mode. The regeneration mode may refer to regeneration of the PMA 132.

Referring now also to FIGS. 3-4, an example of the underfloor assembly 131 (engine exhaust gas treatment device) is shown. The underfloor assembly 131 may include a housing 144, a PMA 146 (e.g., a HC adsorber), a bypass conduit 148, a catalyst member 150, and a bypass valve assembly 152. The housing 144 may define an exhaust gas inlet 154 and an exhaust gas outlet 156 and may include a nozzle 158 at the exhaust gas inlet 154. The PMA 146 may be located within the housing 144 between the exhaust gas inlet 154 and an exhaust gas outlet 156 forming a first flow path between the exhaust gas inlet 154 and the exhaust gas outlet 156. As an example, the PMA 146 may include a zeolite material. The zeolite material may be used for treatment of alcohol-based fuel emissions, such as methanol emissions, ethanol emissions, E85 emissions, etc. The catalyst member 150 may include a three-way catalyst.

The bypass conduit 148 may extend through the PMA 146 and define a bypass passage 160. The bypass passage 160 defines a second flow path between the exhaust gas inlet 154 and the exhaust gas outlet 156 parallel to the first flow path defined through the PMA 146.

The catalyst member 150 may be located between the PMA 146 and the bypass conduit 148 and the exhaust gas outlet 156. The catalyst member 150 may receive exhaust gas exiting the PMA 146 and/or the bypass conduit 148 depending on the position of the bypass valve assembly 152 as discussed below.

The bypass valve assembly 152 may include a bypass valve 162 located in the bypass passage 160 and an electric actuation mechanism 164 engaged with the bypass valve 162 to displace the bypass valve 162 between a closed position (shown in FIG. 3) and an open position (shown in FIG. 4). The bypass valve 162 enables passage of exhaust through the bypass passage 160 between the exhaust gas inlet 154 and the exhaust gas outlet 156. The bypass valve 162 enables this passage when in the open position and inhibits (or prevents) communication between the exhaust gas inlet 154 and the exhaust gas outlet 156 when in the closed position. The bypass valve assembly 152 may also include a bypass valve sensor that detects position of the bypass valve 162. This information may be feedback to the ECM 40 and/or the regeneration control module 48 for position control of the bypass valve 162.

The nozzle 158 may form a converging nozzle including a nozzle outlet 166 defining a first inner diameter (D1). The nozzle outlet 166 may be located adjacent to an inlet 168 of the bypass passage 160 defined at an end 170 of the bypass conduit 148. The nozzle outlet 166 may be concentrically aligned with the inlet 68 of the bypass passage 160.

The inlet 168 of the bypass passage 160 may define a second inner diameter (D2). The first inner diameter (D1) may be less than the second inner diameter (D2). As an example, the first inner diameter (D1) may be eighty percent to ninety-nine percent of the second inner diameter (D2). The nozzle outlet 166 may also be axially spaced a distance (L) from the inlet 168 of the adsorber bypass passage 160. In the example shown, the nozzle outlet 166 is axially spaced less than 10 millimeters from the inlet 168 of the adsorber bypass passage 60. The difference between the first and second inner diameters (D1, D2) and/or distance (L) may define a spacing between the nozzle outlet 166 and the inlet 168 of the bypass passage 160.

The end 170 of the bypass conduit 148 defining the inlet 168 may extend axially outward from the PMA 146 in a direction from the exhaust gas outlet 156 toward the exhaust gas inlet 154. The housing 144 may define an annular chamber 172 surrounding the bypass conduit 148 at a location axially between the inlet 168 of the bypass passage 160 and the PMA 146. The annular chamber 172 may be in communication with the exhaust gas inlet 154 through the spacing defined between the nozzle outlet 166 and the inlet 168 of the bypass passage 160.

The exhaust gas from the engine 14 may flow through the PMA 146 in a first direction (A1) from the exhaust gas inlet 154 to the exhaust gas outlet 156 when the bypass valve 162 is in the closed position. The exhaust gas may flow from the exhaust gas inlet 154 through the PMA 146 to the catalyst member 150 and out the exhaust gas outlet 156. The housing 144 may include a diffuser 174 between the PMA 146 and the catalyst member 150 and define openings 176. The openings 176 may be used to control exhaust flow rate through the PMA 146.

The exhaust gas may bypass the PMA 146 when the adsorber bypass passage 160 is open and proceed to the catalyst member 150. For example only, approximately 5-10% of the exhaust may flow through the PMA 146 when the bypass passage 160 is open (i.e. the bypass valve 162 is in the open position). A portion of the exhaust gas provided by the engine 14 may flow through the PMA 146 in a reverse direction (discussed below) to purge HC stored within the PMA 146 when the adsorber bypass passage 160 is open.

The exhaust gas may flow through the PMA 146 in a second direction (A2) opposite the first direction (A1) and from the exhaust gas outlet 156 to the exhaust gas inlet 154 when the bypass valve 162 is in the open position. The exhaust gas flows through the adsorber bypass passage 160 in the first direction (A1) to the catalyst member 150 and out the exhaust gas outlet 156. The exhaust gas may flow through the PMA 146 in the second direction (A2) may be generated by the arrangement between the nozzle outlet 166 and the inlet 168 of the bypass conduit 148. More specifically, the spacing between the nozzle outlet 166 and the inlet 168 of the bypass conduit 148 may create a localized low-pressure region within the annular chamber 172.

As a result, a portion of the exhaust gas may flow from a high-pressure region of the housing 144 between the adsorber 146 and the catalyst member 150 through the PMA 146 in the second direction (A2). The exhaust gas may flow to the bypass conduit 148 through the spacing defined between the nozzle outlet 166 and the inlet 168 of the adsorber bypass conduit 148.

Figure 5:
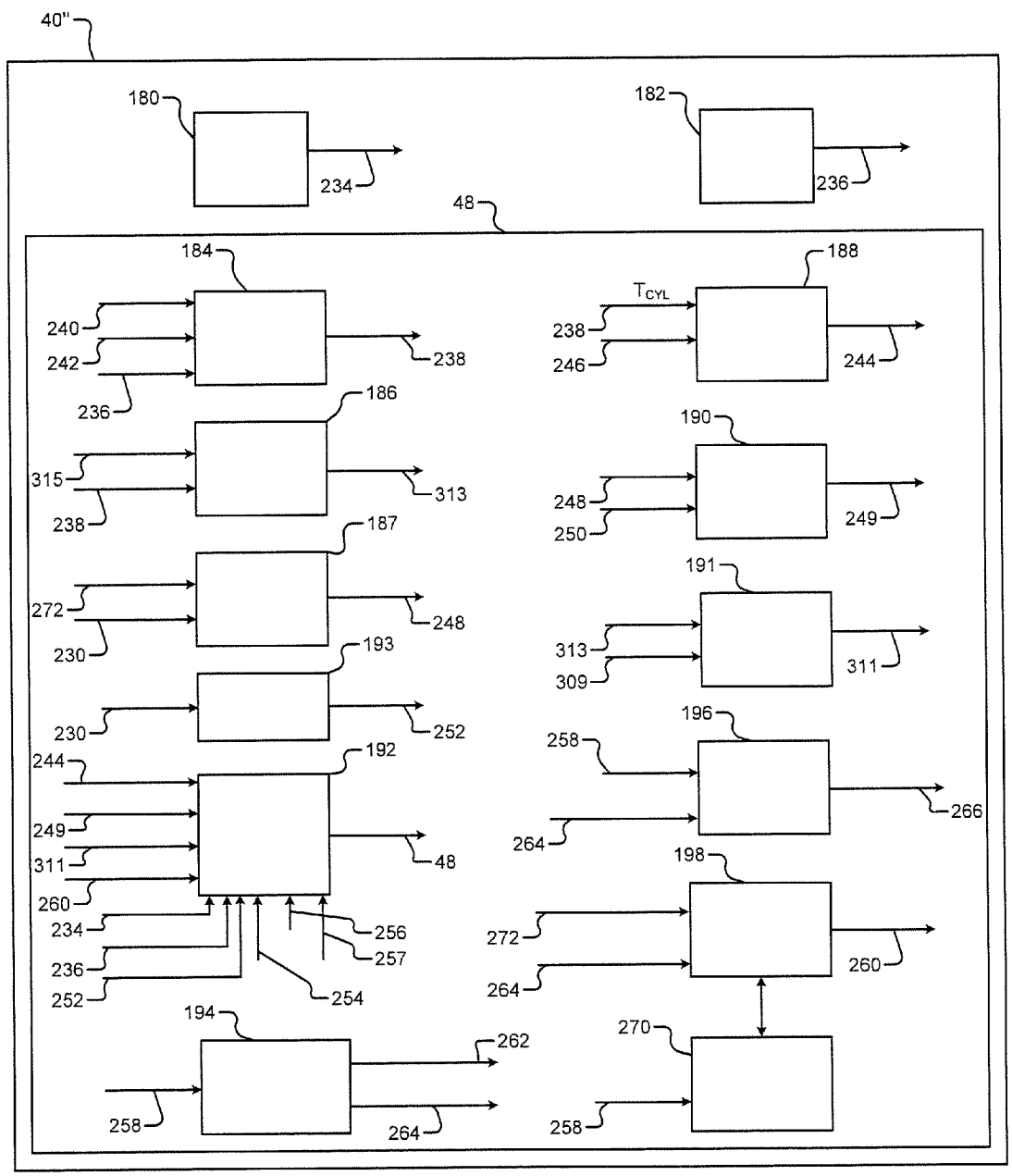
FIG. 5 is a functional block diagram of an engine control module incorporating a regeneration control module in accordance with the present disclosure.

Referring again to FIGS. 1 and 2 and to FIG. 5, where an ECM 40" is shown. The ECM 40" may be used in the regeneration systems 12, 12' of FIGS. 1 and 2. The ECM 40" includes the regeneration control module 48 and may further include a vehicle speed module 180 and an engine speed module 182. The vehicle speed module 180 determines speed of a vehicle based on information from, for example, the vehicle speed sensor 98. The engine speed module 182 determines speed of the engine 14 based on information from, for example, the engine speed sensor 99.

The regeneration control module 48 includes an engine monitoring module 184, a PMA temperature module 186, a PM monitoring module 187, a first comparison module 188, a second comparison module 190, a third comparison module 191, a mode selection module 192, a soot loading module 193, a bypass valve control module 194, an air pumping module 196 and a regeneration monitoring module 198. The regeneration control module 48 operates in the above-described modes. The regeneration control module 48 may operate in more than one of the modes during the same period. The first and third comparison modules 188, 191 may be incorporated into a single comparison module.

Figure 6:
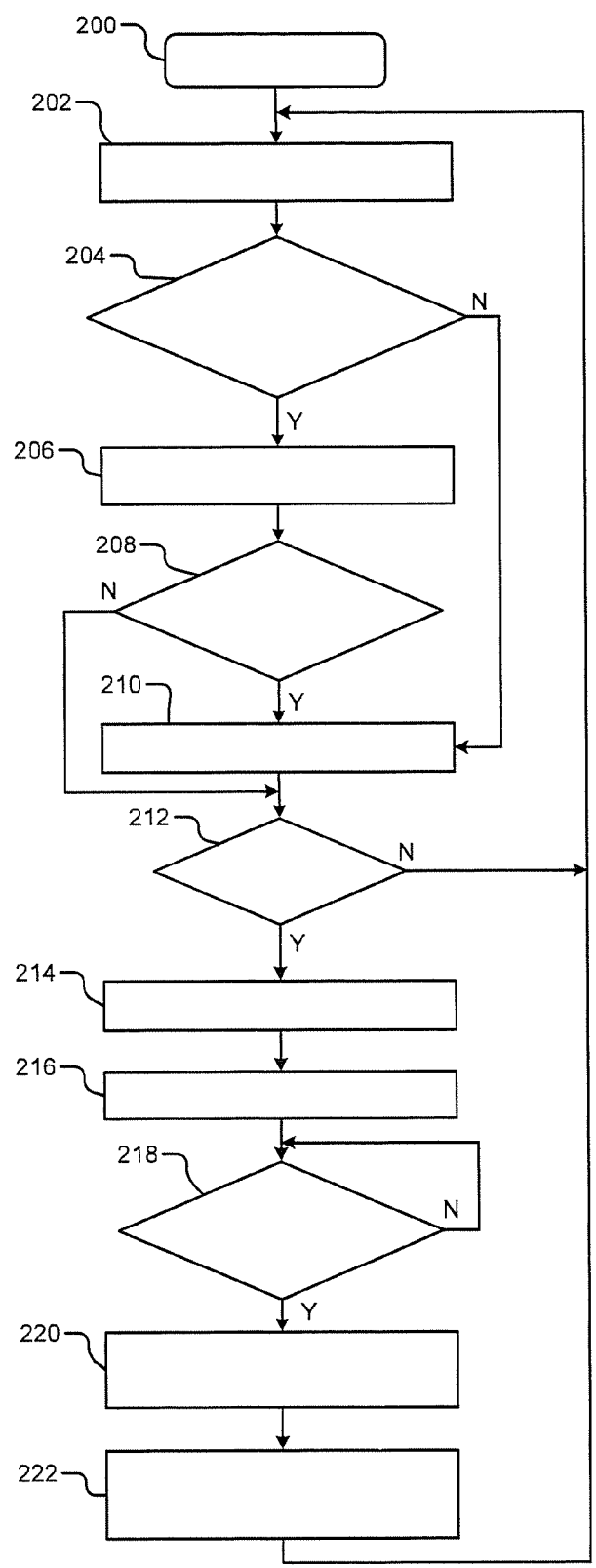
FIG. 6 illustrates a method of operating a particulate matter filter based regeneration system in accordance with the present disclosure.

Referring now also to FIG. 6, a method of operating a PM filter based regeneration system is shown. This method is applicable to a regeneration system that does not include an adsorber. Although the method is described with respect to the implementations of FIGS. 1-5, the method may be applied to other embodiments of the present disclosure. The method may begin at 200. Below-described tasks 202-222 may be iteratively performed and may be performed by one of the ECMs 40, 40', 40" of FIGS. 1, 2 and 5. The engine 14 may be ON (or running) while performing tasks 202-222.

At 202, sensor signals are generated. The sensor signals may include exhaust flow signals, exhaust temperature signals, exhaust pressure signals, soot level signals, pressure differential (or absolute pressure) signals, catalyst temperature signals, an oxygen signal, an intake air flow signal, an intake air pressure signal, an intake air temperature signal, a vehicle speed signal, an engine speed signal, an EGR signal, etc., which may be generated by the above-described sensors 80, 104-112, 118 and 119 of FIGS. 1 and 2.

An example pressure differential signal is a PMA signal $P_{PMAAP}$ 230, which is generated by the fourth flow, pressure and/or temperature sensor 110 and based on an intake exhaust signal $P_{PMAIN}$ and an output exhaust signal $P_{PMAOUT}$. The PMA signal $P_{PMAAP}$ 230 may be a pressure differential across a PM filter and not across an adsorber. The signals $P_{PMAIN}$, $P_{PMAOUT}$ may be generated based on pressures in the tap lines 114, 116. An example vehicle speed signal is vehicle speed signal $S_{VEH}$ 234. An example engine speed signal is engine speed signal $S_{ENG}$ 236.

At 204, the first comparison module 188 determines whether the engine is in a cold start mode. The regeneration control module 48 and/or the engine monitoring module 184 may estimate an engine temperature, such as cylinder temperature $T_{CYL}$ 238. The cylinder temperature $T_{CYL}$ 238 may be determined based on the engine speed signal $S_{ENG}$ 236, a fuel supply signal FUEL 240 and/or an ignition enable signal SPARK 242. The first comparison module generates a first comparison signal $COMP_1$ 244 based on a comparison between the engine temperature and/or cylinder temperature $T_{CYL}$ 238 and a first predetermined temperature (e.g., a predetermined temperature $T_{PRED}$ 246). The regeneration control module 48 proceeds to 206 when the engine temperature and/or cylinder temperature $T_{CYL}$ 238 is less than the first predetermined temperature. The regeneration control module 48 proceeds to 210 when the engine temperature and/or cylinder temperature $T_{CYL}$ 238 is greater than or equal to the first predetermined temperature.

The engine temperature and/or cylinder temperature $T_{CYL}$ 238 may be determined based on engine temperature signals, such as engine coolant and oil temperatures signals. The engine temperature and/or cylinder temperature $T_{CYL}$ 238 may be estimated via a thermal and/or predicted model of the engine.

At 206, the regeneration control module 48 closes a bypass valve (e.g., the bypass valve 136 or 162). This causes exhaust gas to pass through the PM filter, which increases temperature of the PM filter.

At 208, the second comparison module 190 determines whether the engine 14 is operating in a low PM output mode. The PM monitoring module 187 estimates PM output $PM_{EO}$ 248 of the engine 14. The PM output $PM_{EO}$ 248 may be estimated based on an engine temperature (e.g., a cylinder temperature $T_{CYL}$ 238), an engine coolant temperature, an engine oil temperature, and/or based on a prediction model of the engine. The predicted model may be based on vehicle and/or engine system output parameters, such as vehicle mileage, exhaust pressure, exhaust drop off pressure across the PM filter, etc. Mileage approximately corresponds to and/or can be used to estimate vehicle engine operating time and/or the amount of exhaust gas generated.

The second comparison module 190 generates a second comparison signal $COMP_2$ 249 based on a comparison between the PM output $PM_{EO}$ 248 and a predetermined output $PM_{PRED}$ 250. Task 210 is performed when the PM output $PM_{EO}$ 244 is less than a predetermined output $PM_{PRED}$ 250. Task 212 is performed when the PM output $PM_{EO}$ 244 is greater than or equal to the predetermined output $PM_{PRED}$ 250.

At 210, the bypass valve is partially or fully opened to allow exhaust gas to bypass the PM filter. The PM filter may be bypassed when the engine temperature and/or cylinder temperature $T_{CYL}$ 238 is greater than or equal to the predetermined temperature $T_{PRED}$ 246.

At 212, the mode selection module 192 may determine whether to regenerate the PM filter. The soot loading module 193 estimates soot loading $S_I$ 252 of the PM filter. The soot loading module 193 may estimate the soot loading $S_I$ based on a prediction method using parameters, such as vehicle mileage, exhaust pressure, exhaust drop off pressure across the PM filter (e.g., the PMA signal $P_{PMAAP}$ 230), etc.

Exhaust pressure can be used to estimate the amount of exhaust generated over a period of time. When an exhaust pressure exceeds a predetermined pressure threshold or when an exhaust pressure decreases below a predetermined pressure threshold, regeneration may be performed. For example when exhaust pressure entering a PMA exceeds a predetermined pressure threshold, regeneration may be performed. As another example when exhaust pressure exiting a PMA is below a predetermined pressure threshold, regeneration may be performed.

Exhaust drop off pressure may be used to estimate the amount of soot in a PMA. For example, the amount of soot loading increases as the drop off pressure increases. The exhaust drop off pressure may be determined by determining pressure of exhaust entering a PMA minus pressure of exhaust exiting the PMA. The fourth flow, pressure and/or temperature sensor 110 may be used to detect the drop off pressure.

The prediction method may include the determination of one or more engine operating conditions, such as engine load, fueling schemes (patterns, volumes, etc.), fuel injection timing, and an exhaust gas recirculation (EGR) level. A cumulative weighting factor may be used based on the engine operating conditions. The cumulative weighting factor is related to soot loading. When the cumulative weighting factor exceeds a threshold, regeneration may be performed.

The mode selection module 192 may control regeneration including initiating, pausing and stopping or ending regeneration based on various parameters. For example, the mode selection module 192 may control regeneration and generate a mode signal MODE 258 based on the vehicle speed signal $S_{VEH}$ 234, the engine speed signal $S_{ENG}$ 236, the first comparison signal $COMP_1$ 244, the second comparison signal $COMP_2$ 249, the soot load $S_I$ 252, a regeneration complete signal REGCOMP 260. The mode selection module 192 may also control regeneration and generate the mode signal MODE 258 based on other signals, such as a PMA temperature signal $T_{PF}$ 254, a catalyst temperature signal $T_{CAT}$ 256 of one of the catalysts 18, 134, an exhaust flow rate signal $F_{EXH}$ 257, etc.

At 214, the regeneration control module 48 closes the bypass valve. This initiates the air pumping mode. The bypass valve may be adjusted to a fully closed state. The bypass valve control module 194 generates a bypass control signal BVCONT 262 and an air pump enable signal PUMPENABLE 264 based on the mode signal MODE 258.

At 216, the air pumping module 196 generates an air pumping signal AIRPUMP 266 based on the mode signal MODE and the pump enable signal PUMPENABLE 264. The air pumping signal AIRPUMP 266 is generated to activate the air pump 46 to inject ambient air into the exhaust system 16.

The pumping of air into the exhaust system 16 leverages thermal energy in the engine 14, the close-coupled catalyst and/or other components of the exhaust system 16 to regenerate the PM filter. The injected air is heated by the engine 14 and by exhaust system components and is then passed through the PM filter. This increases temperature of the PM filter to a temperature that is greater than a regeneration temperature. The PM filter then releases trapped PM. The temperature of the PM filter is maintained above, for example, 600° C. (regeneration temperature) during regeneration. During PM filter regeneration, temperature of the underfloor catalyst 134 may be greater than or equal to the light-off temperature. Task 214 may be performed while task 216 is performed.

At 218, the regeneration control module 48 and/or the regeneration monitoring module 198 determines whether regeneration of the PM filter is complete. The regeneration monitoring module 198 may determine if regeneration is complete based on a thermal energy model of the PM filter and/or the underfloor catalyst 134 using, for example, equation 1.

$$\text{Energy} = f\left\{ \begin{array}{c} T_{UFCAT}, F_{Rate}, S_{ENG}, A_{Mass}, C_{Mass}, A_{IMP}, C_{IMP}, T_{EXH}, DC, \\ E_{RunTime}, E_{Load}, T_{AMB}, CAM, SPK, R_{time} \end{array} \right\} \quad (1)$$

$T_{UFCAT}$ is temperature of the underfloor catalyst 134. $F_{Rate}$ is exhaust flow rate through the CC 18, which may be a function of mass air flow and fuel quantity supplied to the cylinders 28. The mass air flow may be determined by a mass air flow sensor, such as the intake air flow sensor 92. $A_{Mass}$ is mass of the PM filter. $C_{Mass}$ is mass of the underfloor catalyst 134. $A_{IMP}$ is resistance or impedance of the PM filter. $C_{IMP}$ is resistance or impedance of the underfloor catalyst. $T_{EXH}$ may refer to a temperature of the exhaust system 16, and based on one or more of the temperature sensors 104-112. DC is duty cycle of the engine. $E_{RunTime}$ is time that the engine 14 is activated (ON). $E_{Load}$ is current load on the engine 14. $T_{amb}$ is ambient temperature. CAM is cam phasing of the engine 14. SPK is spark timing. $R_{time}$ is the amount of time that the regeneration control module 48 is in the regeneration mode (current regeneration period). This may be measured via a regeneration timer 270.

The thermal energy model of the PM filter and/or underfloor catalyst 134 refers to the thermal energy received by the PM filter and/or underfloor catalyst 134. The thermal energy model may include other engine characteristics, close-coupled catalyst and/or underfloor catalyst characteristics, such as sizes and volumes of the engine 14, the close-coupled catalyst 18, the PM filter, and the underfloor catalyst 134. Regeneration may be complete when the thermal energy Energy is greater than a predetermined thermal energy for a predetermined period and/or when the regeneration timer 270 exceeds a predetermined period. The regeneration monitoring module 198 may generate the regeneration complete signal REGCOMP 260 based on an engine parameter signal ENGPARS 272 and/or the pump enable signal PUMPENABLE 264. The engine parameter signal ENGPARS 272 may include parameters in the thermal model of equation 1.

At 220, the regeneration control module 48 and the air pumping module 196 cease operating in the air pumping mode. The air pump 46 may be deactivated. At 222, the bypass valve control module 194 adjusts position of the bypass valve to a partially or fully open position.

Figure 7:
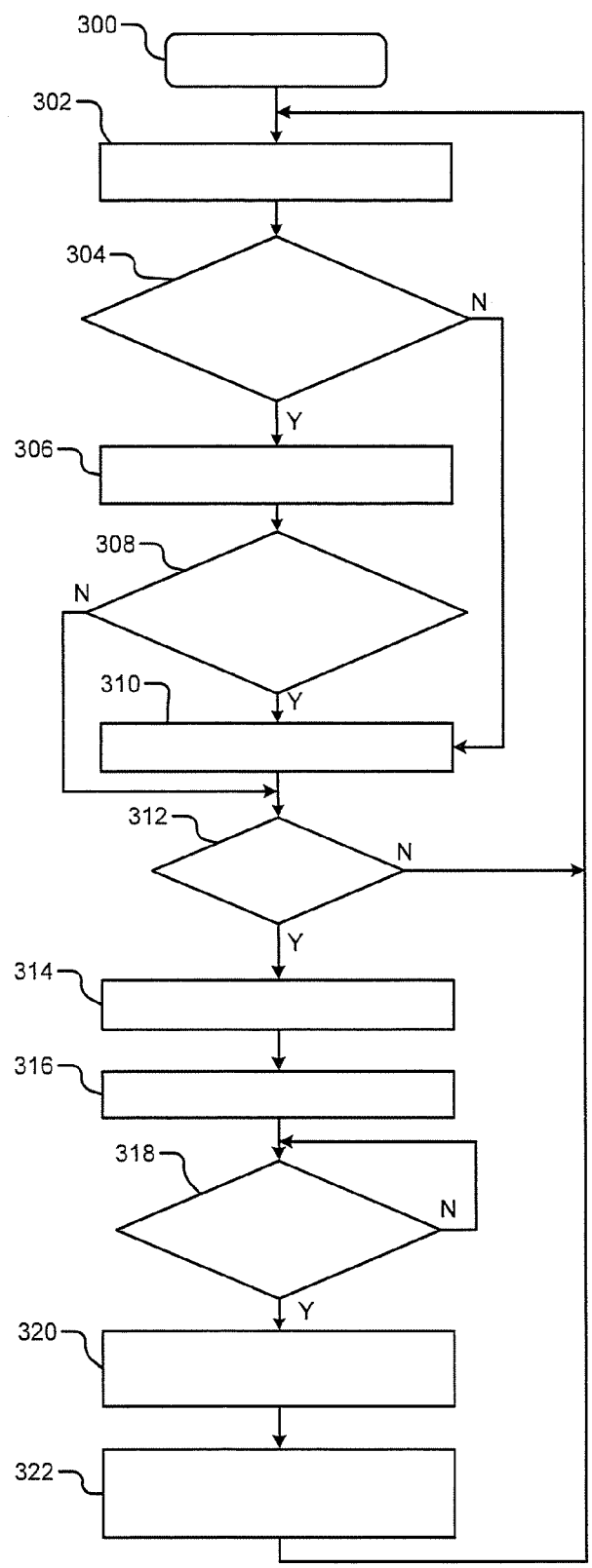
FIG. 7 illustrates a method of operating a particulate matter filter and adsorber based regeneration system in accordance with the present disclosure.

Referring now also to FIG. 7, a method of operating a PM filter and absorber based regeneration system is shown. Although the method is described with respect to the implementations of FIGS. 1-5, the method may be applied to other embodiments of the present disclosure. The method may begin at 300. Below-described tasks 302-322 may be iteratively performed and may be performed by one of the ECMs 40, 40', 40'' of FIGS. 1, 2 and 5. The engine 14 may be ON (or running) while performing tasks 302-322.

At 302, sensor signals are generated, as in task 202. The PMA signal $P_{PMAAP}$ 230 may be a pressure differential across the PM filter and adsorber. At 304, the first comparison module 188 determines whether the engine is in a cold start mode, as in task 204. The regeneration control module 48 proceeds to 306 when the engine temperature and/or cylinder temperature $T_{CYL}$ 238 is less than a second predetermined temperature (e.g., the predetermined temperature $T_{PRED}$ 246). The regeneration control module 48 proceeds to 310 when the engine temperature and/or cylinder temperature $T_{CYL}$ 238 is greater than or equal to the second predetermined temperature. The second predetermined temperature may be different than the first predetermined temperature.

At 306, the regeneration control module 48 closes a bypass valve (e.g., the bypass valve 136 or 162). This causes exhaust gas to pass through the PM filter and absorber, which increases temperature of the PM filter and absorber.

At 308, the second comparison module determines whether the engine 14 is operating in a low PM output mode and the third comparison module 191 determines whether temperature of the PM filter and absorber is greater than an adsorber release temperature $T_{ABSREL}$ 309. The PM monitoring module 187 estimates PM output $PM_{EO}$ 248 of the engine 14. The PM output $PM_{EO}$ 248 may be estimated based on an engine temperature (e.g., the cylinder temperature $T_{CYL}$ 238), an engine coolant temperature, an engine oil temperature, and/or based on a prediction model of the engine. The predicted model may be based on vehicle and/or engine system output parameters, such as vehicle mileage, exhaust pressure, exhaust drop off pressure across the PM filter and absorber, etc.

The second comparison module 190 generates a second comparison signal $COMP_2$ 249 based on a comparison between the PM output $PM_{EO}$ 248 and a predetermined output $PM_{PRED}$ 250. The third comparison module 191 generates a third comparison signal $COMP_3$ 311 based on a comparison between the adsorber release temperature $T_{ABSREL}$ 309 and a current (second) PMA temperature $T_{PMA2}$ 313. The PMA temperature module 186 may generate the current PMA temperature $T_{PMA2}$ 313 based on (i) a first PMA temperature signal $T_{PMA1}$ from the temperature sensor 119 and/or (ii) the cylinder temperature $T_{CYL}$ 238.

Task 310 is performed when (i) the PM output $PM_{EO}$ 244 is less than a predetermined output $PM_{PRED}$ 250 and/or (ii) the current PMA temperature $T_{PMA2}$ 313 is greater than the adsorber release temperature $T_{ABSREL}$ 309. Task 312 is performed when (i) the PM output $PM_{EO}$ 244 is greater than or equal to the predetermined output $PM_{PRED}$ 250 and/or (ii) the current PMA temperature $T_{PMA2}$ 313 is less than or equal to the adsorber release temperature $T_{ABSREL}$ 309.

At 310, the bypass valve is partially or fully opened to allow exhaust gas to bypass the PM filter and absorber. The PM filter and absorber may be bypassed when the engine temperature and/or cylinder temperature $T_{CYL}$ 238 is greater than or equal to the second predetermined temperature.

At 312, the mode selection module 192 may determine whether to regenerate the PM filter and absorber, similar to the determination at task 212. The soot loading module 193 estimates soot loading $S_I$ 252 of the PM filter and absorber. The soot loading module 193 may estimate the soot loading $S_I$ based on a prediction method using parameters, such as vehicle mileage, exhaust pressure, exhaust drop off pressure across the PM filter (e.g., the PMA signal $P_{PMAAP}$ 230), etc.

The prediction method may include the determination of one or more engine operating conditions, such as engine load, fueling schemes (patterns, volumes, etc.), fuel injection timing, and an exhaust gas recirculation (EGR) level. A cumulative weighting factor may be used based on the engine conditions. The cumulative weighting factor is related to soot loading. When the cumulative weighting factor exceeds a threshold, regeneration may be performed.

The mode selection module 192 may control regeneration including initiating, pausing and stopping or ending regeneration based on various parameters. For example, the mode selection module 192 may control regeneration and generate the mode signal MODE 258 based on the vehicle speed signal $S_{VEH}$ 234, the engine speed signal $S_{ENG}$ 236, the first comparison signal $COMP_1$ 244, the second comparison signal $COMP_2$ 249, the soot load $S_I$ 252, the third comparison signal $COMP_3$ 311, the regeneration complete signal REGCOMP 260. The mode selection module 192 may also control regeneration and generate the mode signal MODE 258 based on other signals, such as the PMA temperature signal $T_{PF}$ 254, the catalyst temperature signal $T_{CAT}$ 256, the exhaust flow rate signal $F_{EXH}$ 257, etc.

At 314, the regeneration control module 48 closes the bypass valve. This initiates the air pumping mode. The bypass valve may be fully closed. The bypass valve control module 194 generates the bypass control signal BVCONT 262 and the air pump enable signal PUMPENABLE 264 based on the mode signal MODE 258.

At 316, the air pumping module 196 generates the air pumping signal AIRPUMP 266 based on the mode signal MODE and the pump enable signal PUMPENABLE 264. The air pumping signal AIRPUMP 266 is generated to activate the air pump 46 to inject ambient air into the exhaust system 16.

The pumping of air into the exhaust system 16 leverages thermal energy in the engine 14, the close-coupled catalyst and/or other components of the exhaust system 16 to regenerate the PM filter and absorber. The injected air is heated by the engine 14 and by exhaust system components and is then passed through the PM filter and absorber. This increases temperature of the PM filter and absorber to a temperature that is greater than a regeneration temperature. The PM filter and absorber then releases trapped HC, which is oxidized by the underfloor catalyst 134. The temperature of the PM filter and absorber is maintained above at least, for example, 600° C. (regeneration temperature) during regeneration. During PM filter and absorber regeneration, temperature of the underfloor catalyst 134 may be greater than or equal to the light-off temperature. Task 314 may be performed while task 316 is performed.

At 318, the regeneration control module 48 and/or the regeneration monitoring module 198 determines whether regeneration of the PM filter and absorber is complete. The regeneration monitoring module 198 may determine if regeneration is complete based on a thermal energy model of the PM filter and absorber and/or the underfloor catalyst 134 using, for example, equation 1.

The thermal energy model of the PM filter and absorber and/or underfloor catalyst 134 refers to the thermal energy received by the PM filter and absorber and/or underfloor catalyst 134. The thermal energy model may include other engine characteristics, close-coupled catalyst and/or underfloor catalyst characteristics, such as sizes and volumes of the engine 14, the close-coupled catalyst 18, the PM filter and absorber, and the underfloor catalyst 134. Regeneration may be complete when the thermal energy Energy is greater than a predetermined thermal energy for a predetermined period and/or when the regeneration timer 270 exceeds a predetermined period. The regeneration monitoring module 198 may generate the regeneration complete signal REGCOMP 260 based on an engine parameter signal ENGPARS 272 and/or the pump enable signal PUMPENABLE 264. The engine parameter signal ENGPARS 272 may include parameters in the thermal model of equation 1.

At 320, the regeneration control module 48 and the air pumping module 196 cease operating in the air pumping mode. The air pump 46 may be deactivated. At 322, the bypass valve control module 194 adjusts position of the bypass valve to a partially or fully open position.

The above-described tasks of FIGS. 6 and 7 are meant to be illustrative examples; the tasks may be performed sequentially, synchronously, simultaneously, continuously, during overlapping time periods or in a different order depending upon the application.

The above-described implementations reduce exhaust backpressure when not operating in a cold start mode and/or in a regeneration mode. The implementations decrease the number of regenerations of an exhaust system due to increased times between regenerations, as a PMA is bypassed during low PM output modes. PM is trapped during high or peak soot generation periods. A PM filter is integrated with an adsorber and within an underfloor assembly to aid in satisfying a partial zero emissions vehicle (PZEV) system HC and PM emission requirements.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A regeneration system comprising: a bypass valve; a first electronic circuit configured to generate a first comparison signal based on at least one of (i) a comparison between a first temperature of an adsorber and an adsorber release temperature and (ii) a comparison between a second temperature of an engine and a predetermined temperature; a second electronic circuit configured to (i) determine whether the engine is operating in a low particulate matter output mode by comparing an amount of particulate matter output of the engine to a predetermined amount and (ii) generate a second comparison signal indicating whether the engine is operating in the low particulate matter output mode, wherein the engine is operating in the low particulate matter output mode if the amount of particulate matter output is less than the predetermined amount; a third electronic circuit configured to select a mode and to generate a mode signal based on the first comparison signal and the second comparison signal; and a fourth electronic circuit configured to, based on the mode signal, adjust a position of the bypass valve to bypass at least one of a particulate matter (PM) filter and the adsorber, wherein the fourth electronic circuit is configured to open the bypass valve to bypass the adsorber in response to the first temperature of the adsorber being greater than the adsorber release temperature, the second temperature of the engine being greater than the predetermined temperature, and the amount of particulate matter output of the engine being less than the predetermined amount; and close the bypass valve to direct exhaust gas through the adsorber in response to the first temperature of the adsorber being less than or equal to the adsorber release temperature, the second temperature of the engine being less than or equal to the predetermined temperature, and the amount particulate matter output of the engine being greater than or equal to the predetermined amount.

2. The regeneration system of claim 1, wherein the fourth electronic circuit is configured to bypass the at least one of the PM filter and the adsorber based on regeneration of the at least one of the PM filter and the adsorber.

3. The regeneration system of claim 1, wherein the fourth electronic circuit is configured to bypass the at least one of the PM filter and the adsorber in response to:
the first temperature of the adsorber being less than the adsorber release temperature;
the second temperature of the engine being greater than the predetermined temperature; and
the amount of particulate matter output of the engine being less than the predetermined amount.

4. The regeneration system of claim 1, wherein the first electronic circuit is a same electronic circuit as at least one of the second electronic circuit, the third electronic circuit, and the fourth electronic circuit.

5. The regeneration system of claim 1, wherein each of the first electronic circuit, the second electronic circuit, the third electronic circuit, and the fourth electronic circuit includes at least one of an electronic circuit, an application specific integrated circuit, a processor, memory, and a combinational logic circuit.

6. The regeneration system of claim 1, wherein the fourth electronic circuit is configured to:
bypass the PM filter in response to
the first temperature of the adsorber being greater than the adsorber release temperature,
the second temperature of the engine being greater than the predetermined temperature, and
the amount of particulate matter output of the engine being less than the predetermined amount; and
close the bypass valve to direct exhaust gas through the PM filter in response to
the first temperature of the adsorber being less than or equal to the adsorber release temperature, the second temperature of the engine being less than or equal to the predetermined temperature, and the amount of particulate matter output of the engine being greater than or equal to the predetermined amount.

7. The regeneration system of claim 1, wherein the fourth electronic circuit is configured to, while the PM filter is not being regenerated, bypass at least one of the adsorber and the PM filter in response to (i) the first temperature of the adsorber being greater than the adsorber release temperature, (ii) the second temperature of the engine being greater than the predetermined temperature, or (iii) the amount of particulate matter output of the engine being less than the predetermined amount.

8. The regeneration system of claim 1, wherein the fourth electronic circuit is configured to bypass at least one of the adsorber and the PM filter while the PM filter is not being regenerated and in response to the amount of particulate matter output of the engine being less than the predetermined amount.

9. The regeneration system of claim 1, wherein the fourth electronic circuit is configured to bypass at least one of the adsorber and the PM filter while the PM filter is not being regenerated and in response to (i) the first temperature of the adsorber being greater than the adsorber release temperature or the second temperature of the engine being greater than the predetermined temperature, and (ii) the amount of particulate matter output of the engine being less than the predetermined amount.

10. The regeneration system of claim 1, wherein the fourth electronic circuit is configured to bypass the at least one of the PM filter and the adsorber in response to the first temperature of the adsorber being less than the adsorber release temperature.

11. The regeneration system of claim 10, wherein the fourth electronic circuit is configured to close the bypass valve to direct exhaust gas through the at least one of the PM filter and the adsorber in response to the first temperature of the adsorber being greater than or equal to the adsorber release temperature.

12. The regeneration system of claim 1, wherein the fourth electronic circuit is configured to bypass the at least one of the PM filter and the adsorber in response to the second temperature of the engine being greater than the predetermined temperature.

13. The regeneration system of claim 12, wherein the fourth electronic circuit is configured to:
close the bypass valve to direct exhaust gas through the at least one of the PM filter and the adsorber in response to the second temperature of the engine being less than or equal to the predetermined temperature;
bypass the at least one of the PM filter and the adsorber in response to the amount of particulate matter output of the engine being less than the predetermined amount; and
close the bypass valve to direct exhaust gas through the at least one of the PM filter and the adsorber in response to the amount of particulate matter output of the engine being greater than or equal to the predetermined amount.

14. A regeneration system comprising:
a first electronic circuit configured to generate a first comparison signal based on at least one of (i) a comparison between a first temperature of an adsorber and an adsorber release temperature and (ii) a comparison between a second temperature of an engine and a predetermined temperature;

a second electronic circuit configured to (i) determine whether the engine is operating in a low particulate matter output mode by comparing a particulate matter output of the engine to a predetermined output and (ii) generate a second comparison signal indicating whether the engine is operating in the low particulate matter output mode, wherein the engine is operating in the low particulate matter output mode if the particulate matter output is less than the predetermined output;
a third electronic circuit configured to select a mode and to generate a mode signal based on the first comparison signal and the second comparison signal; and
a fourth electronic circuit configured to, based on the mode signal, adjust a position of a bypass valve to bypass at least one of a particulate matter (PM) filter and the adsorber,
wherein the fourth electronic circuit is configured to:
bypass the adsorber or the PM filter in response to
the first temperature of the adsorber being greater than the adsorber release temperature,
the second temperature of the engine being greater than the predetermined temperature, and
the particulate matter output of the engine being less than the predetermined output; and
close the bypass valve to direct exhaust gas through the adsorber and the PM filter in response to
the first temperature of the adsorber being less than or equal to the adsorber release temperature,
the second temperature of the engine being less than or equal to the predetermined temperature, and
the particulate matter output of the engine being greater than or equal to the predetermined output.

15. A method of operating a regeneration system comprising:
generating a first comparison signal based on at least one of (i) a comparison between a first temperature of an adsorber and an adsorber release temperature and (ii) a comparison between a second temperature of an engine and a predetermined temperature;
determining whether the engine is operating in a low particulate matter output mode by comparing an amount of particulate matter output of the engine to a predetermined amount;
generating a second comparison signal indicating whether the engine is operating in the low particulate matter output mode, wherein the engine is operating in low particulate matter output mode if the amount of particulate matter output is less than the predetermined amount;
selecting a mode and generating a mode signal based on the first comparison signal and the second comparison signal; and
based on the mode signal, adjusting a position of a bypass valve to bypass at least one of a particulate matter (PM) filter and the adsorber,
bypassing the PM filter in response to
the first temperature of the adsorber being greater than the adsorber release temperature,
the second temperature of the engine being greater than the predetermined temperature, and
the amount of particulate matter output of the engine being less than the predetermined amount; and
closing the bypass valve to direct exhaust gas through the PM filter in response to
the first temperature of the adsorber being less than or equal to the adsorber release temperature, the second temperature of the engine being less than or equal to the predetermined temperature, and the amount of particulate matter output of the engine being greater than or equal to the predetermined amount.

16. The method of claim 15, further comprising:

bypassing the at least one of the PM filter and the adsorber in response to the first temperature of the adsorber being less than the adsorber release temperature; and closing the bypass valve to direct exhaust gas through the at least one of the PM filter and the adsorber in response to the first temperature of the adsorber being greater than or equal to the adsorber release temperature.

17. The method of claim 15, further comprising:

bypassing the at least one of the PM filter and the adsorber in response to the second temperature of the engine being greater than the predetermined temperature; and closing the bypass valve to direct exhaust gas through the at least one of the PM filter and the adsorber in response to the second temperature of the engine being less than or equal to the predetermined temperature.

18. The method of claim 15, further comprising:

bypassing the at least one of the PM filter and the adsorber in response to the amount of particulate matter output of the engine being less than the predetermined amount;

closing the bypass valve to direct exhaust gas through the at least one of the PM filter and the adsorber in response to the amount particulate matter output of the engine being greater than or equal to the predetermined amount; and bypassing the at least one of the PM filter and the adsorber based on regeneration of the at least one of the PM filter and the adsorber.

19. The method of claim 15, further comprising:

bypassing the at least one of the PM filter and the adsorber in response to the first temperature of the adsorber being less than the adsorber release temperature, the second temperature of the engine being greater than the predetermined temperature, and the amount particulate matter output of the engine being less than the predetermined amount; and continuing to bypass the at least one of the PM filter and the adsorber if regeneration of the at least one of the PM filter and the adsorber is not completed; and ceasing bypassing of the at least one of the PM filter and the adsorber if regeneration of the at least one of the PM filter and the adsorber is completed.

* * * * *